Aug. 2, 1927.

C. M. SEMLER 1,637,879

TIRE REPAIR VULCANIZER

Filed Sept. 5. 1924

2 Sheets-Sheet 1.

INVENTOR.
CLYDE M SEMLER
BY A. L. Ely
ATTORNEY.

Aug. 2, 1927.

C. M. SEMLER 1,637,879

TIRE REPAIR VULCANIZER

Filed Sept. 5. 1924

2 Sheets-Sheet 2

INVENTOR.
CLYDE M SEMLER
BY
ATTORNEY.

Patented Aug. 2, 1927.

1,637,879

UNITED STATES PATENT OFFICE.

CLYDE M. SEMLER, OF AKRON, OHIO, ASSIGNOR TO THE FIRESTONE TIRE AND RUBBER COMPANY, OF AKRON, OHIO, A CORPORATION OF OHIO.

TIRE-REPAIR VULCANIZER.

Application filed September 5, 1924. Serial No. 736,051.

This invention relates to repair vulcanizers and particularly to vulcanizers adapted especially for use on tires of large section, as, for example, truck tires.

The chief object of the invention is to provide an improved vulcanizer of simpler construction whereby it will be capable of easier operation and particularly to provide a vulcanizer in which a tire may be more effectively held against the mandrel, means being provided to urge the beads of the tire against the mandrel by substantially uniform pressure about the arc of the tire engaged on the mandrel.

The foregoing and other objects will become more apparent as the following description is read in connection with the accompanying drawings, it being understood that the invention is not limited to the specific structure shown and described.

Figure 1:
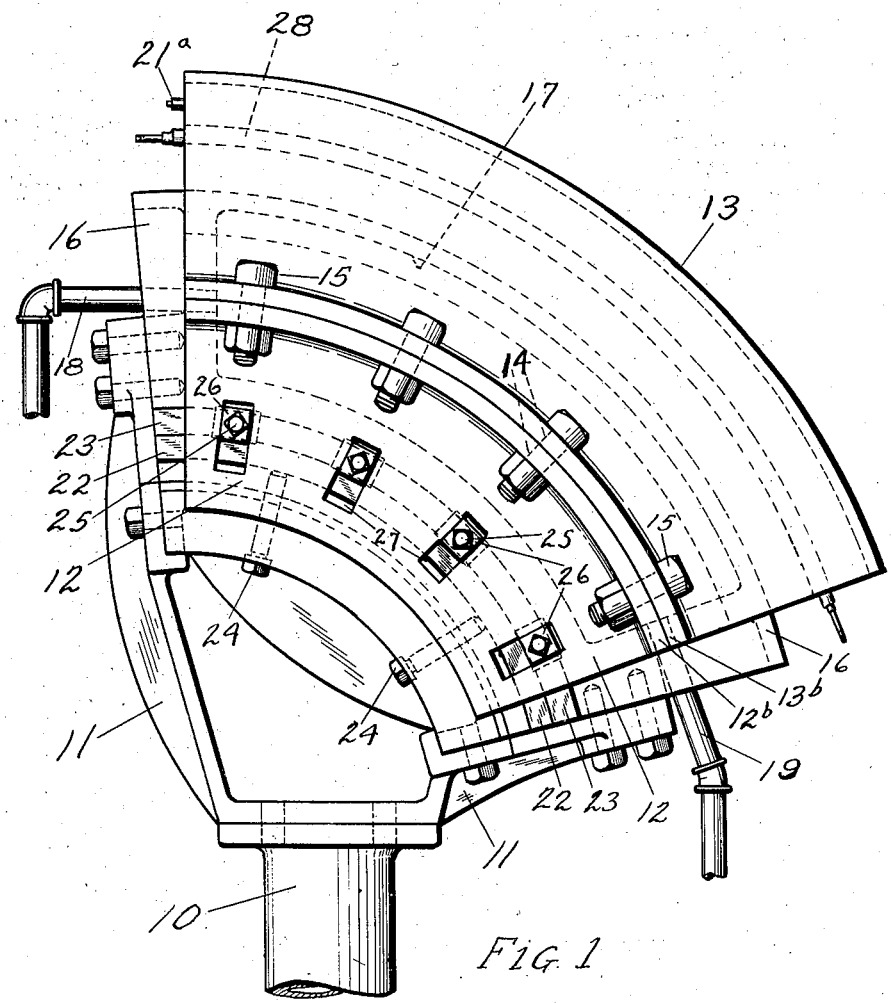
Figure 2:
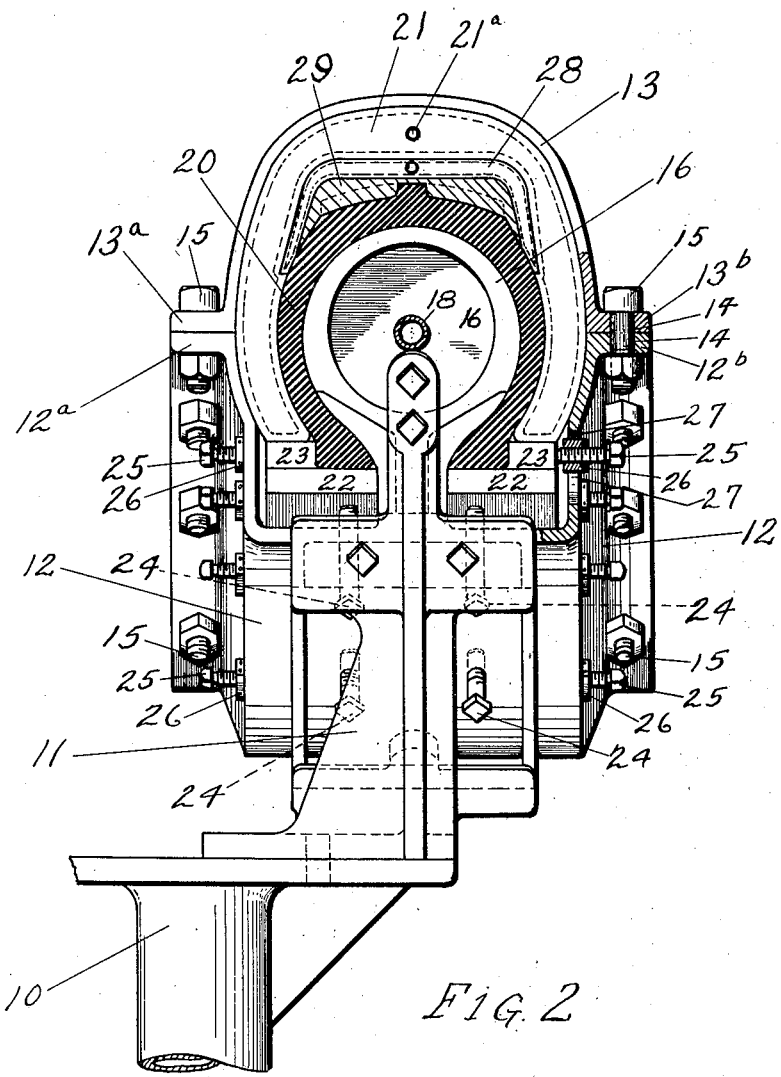

Of the accompanying drawings:

Figure 1 is a reduced side elevation of a vulcanizer embodying the invention; and Figure 2 is a left end elevation thereof.

Referring to the drawings, 10 is a stand on which is mounted a bracket 11. The bracket 11 is so formed, as shown better in Figure 1, as to have bolted thereon a lower shell or envelope section 12 which is substantially U-shaped in section and is formed longitudinally on the arc of a circle or as a partial annulus (Figure 1). The shell section 12 has circumferential flanges $12^a$ and $12^b$ extending laterally from its outer edges, which flanges are adapted to provide a seat for an upper shell section 13 of inverted U-shape in section having corresponding flanges $13^a$ and $13^b$ adapted to seat respectively on flanges $12^a$ and $12^b$. Each pair of flanges $12^a$ and $13^a$ and $12^b$ and $13^b$ have aligned apertures 14, 14 (Figure 2) spaced circumferentially therein and adapted to receive bolts 15, 15 by which the two shell sections 12 and 13 may be secured together.

The bracket 11 is also adapted to have bolted thereon a hollow mandrel or core 16 having a chamber 17 therein for the reception of a heating or cooling medium which may be conducted thereto by a pipe 18 and exhausted or drained therefrom by a pipe 19. The core 16 is so formed, as shown in Figure 2, as to fit the inner surface of a tire indicated in section at 20 in the above figure.

To the end that the tire 20 will be held under pressure against the mandrel 16 throughout the surface engaged thereon, an expansible bag 21 is provided which is so shaped on its outer surface as to fit the outer shell sections 12 and 13 and which is so formed on its inner surface as so extend transversely about the tire from closely adjacent one bead to closely adjacent the other (Figure 2). It will be obvious, of course, that longitudinally the bag 21 is also formed as a partial annulus and has the usual inlet $21^a$ closed by a check valve.

For pressing the beads of the tire against the mandrel 16, there is employed a pair of arc-shaped strips 22, 22, the strips 22 being adapted to engage the circumferential inner edges of the beads, and a second pair of arc-shaped strips 23, 23 is seated on the strips 22 and arranged so as to be adapted to engage the outer side of the beads. The strips 22 are supported and adapted to be urged against the beads by screws 24, 24 threaded through apertures in the shell section 12, and the strips 23 have screws 25, 25 engaged with their outer sides, the screws 25 being engaged in nuts 26, 26 which are slidable in slots 27, 27 in the shell section 12 whereby the screws 25 are adapted to exert pressure on strips 23 in any of the positions thereof.

The device is adapted for use in vulcanizing various repaired portions of the tire either in the tread or side-walls, a suitable hot plate, as indicated at 28, being employed against the repaired portion between the bag 21 and the tire 20. The plate 28 may be so formed as to be adapted to vulcanize at the tread, as shown, a vulcanized rubber matrix 29 being mounted in the plate for this purpose, or a hot plate of suitable shape may be interposed between the bag 21 and the side-wall of the tire. It has been found desirable to employ the hot plates disclosed and claimed in applicant's prior Patent No. 1,548,215, granted August 4, 1925.

In use, the outer shell section 13 being removed, the tire 20, plate 28 and bag 21 are assembled and mounted over the mandrel 16. The strips 22 and 23 are adjusted so as to press the beads against the mandrel, as shown in Figure 2, and the outer shell section 13 is then applied to section 12 and bolted thereon. Steam is admitted to the mandrel and to the hot plate 28 and air under pressure is supplied to the bag 21. The tire is then left to vulcanize for the required period of time. After vulcanization, the steam is exhausted from the mandrel and hot plate and, if desired, a cooling medium may be admitted thereto and drained therefrom. The air in bag 21 is exhausted, shell section 13 is removed and the strips 22 and 23 are loosened permitting the tire, bag and hot plate to be removed and disassembled.

It will be seen from the foregoing that assembling and disassembling of the apparatus is easily accomplished because only one shell section is removed. Also, by providing that one shell section be stationary, pressure can be readily and uniformly transmitted to the beads by use of the strips 22 and 23.

Modifications of the invention may be resorted to without departing from the spirit thereof or the scope of the appended claims.

I claim:

1. A repair vulcanizer for tires comprising a mandrel, a shell enclosing the mandrel, said shell comprising a pair of sections adapted to be detachably secured together, one of said sections being permanently connected to the mandrel, and means on the last named section adapted to be urged against the beads of the tire to hold them against the mandrel, said means comprising pairs of arc-shaped presser strips, one of which is adapted to engage the inner edges of the beads and the other of which is adapted to engage the outer sides of the beads, and means for exerting pressure on said strips.

2. A repair vulcanizer for tires comprising a mandrel, a shell enclosing the mandrel, said shell comprising a section connected to the mandrel and a second section adapted to be detachably secured to the first section, and means adjustable on the first section adapted to engage and press the beads of the tire axially against the mandrel.

3. A repair vulcanizer for tires comprising a mandrel, a shell enclosing the mandrel, said shell comprising a section substantially of U-shape in cross-section connected to the mandrel and a second section substantially of inverted U-shaped in cross-section adapted to mate with and seat on said first named section and to be removably secured thereto.

4. A repair vulcanizer for tires comprising a mandrel, a shell enclosing the mandrel, said shell comprising a section secured to the mandrel and means on the section adapted to exert uniform pressure on the outer sides of the beads of a tire.

5. A repair vulcanizer for tires comprising a mandrel, a shell enclosing the mandrel, said shell comprising a section secured to the mandrel, said section having slots therein, nuts slidable in said slots, screws in said nuts and a bead-presser adapted to be engaged by said screws.

6. A vulcanizer for repairing tires comprising a mandrel, a shell enclosing the mandrel, said shell including a section connected to the mandrel, screws threaded through said section and a bead presser engaged by said screws, said presser being adapted to be urged axially against the outer side of a tire bead.

CLYDE M. SEMLER.